US011247269B2

(12) United States Patent
Lindroos et al.

(10) Patent No.: US 11,247,269 B2
(45) Date of Patent: Feb. 15, 2022

(54) METHOD FOR FORMING POWDER PARTICLES AND A PRODUCT

(71) Applicant: Teknologian Tutkimuskeskus VTT Oy, Espoo (FI)

(72) Inventors: Tomi Lindroos, Tampere (FI); Ulla Kanerva, Tampere (FI); Juha Lagerbom, Tampere (FI); Pertti Lintunen, Tampere (FI)

(73) Assignee: Teknologian Tutkimuskeskus VTT Oy, Espoo (FI)

( * ) Notice: Subject to any disclaimer, the term of this patent is extended or adjusted under 35 U.S.C. 154(b) by 689 days.

(21) Appl. No.: 15/572,350

(22) PCT Filed: Apr. 27, 2016

(86) PCT No.: PCT/FI2016/050272
§ 371 (c)(1),
(2) Date: Nov. 7, 2017

(87) PCT Pub. No.: WO2016/177935
PCT Pub. Date: Nov. 10, 2016

(65) Prior Publication Data
US 2018/0117676 A1    May 3, 2018

(30) Foreign Application Priority Data
May 7, 2015   (FI) .................................. 20155332

(51) Int. Cl.
*B22F 9/20*       (2006.01)
*B22F 1/00*       (2006.01)
*B33Y 70/00*      (2020.01)

(52) U.S. Cl.
CPC .............. *B22F 9/20* (2013.01); *B22F 1/0048* (2013.01); *B33Y 70/00* (2014.12);
(Continued)

(58) Field of Classification Search
None
See application file for complete search history.

(56) References Cited

U.S. PATENT DOCUMENTS 5,108,962 A * 4/1992 Khazai ................ C04B 35/563
501/87
8,182,573 B2 * 5/2012 Stark ........................ C01G 1/02
75/362

(Continued)

FOREIGN PATENT DOCUMENTS

CN    101704682 A    5/2010
CN    102212735 A    10/2011
(Continued)

OTHER PUBLICATIONS

Z.A. Munir, Self-propagating High-temperature Synthesis Encyclopedia of Materials: Science and Technology (Year: 2001).*
(Continued)

*Primary Examiner* — Anthony M Liang
(74) *Attorney, Agent, or Firm* — McCarter & English, LLP

(57) ABSTRACT

The invention relates to a method for forming powder particles, wherein the method comprises feeding a start material mixture including more than one constituents in the form of granules into a reactor comprising a reaction zone and a heat source, performing thermal synthesis in the reaction zone in which the start material mixture is moved and the constituents of the start material mixture react in the presence of heat so that the reaction is started by means of heat of the reactor and energy of the start material mixture is released in the form of heat in order to achieve the reaction, and producing powder particles during the reaction. Further, the invention relates to a powder particle product.

9 Claims, 2 Drawing Sheets

(52) U.S. Cl.
CPC ....... *B22F 2201/10* (2013.01); *B22F 2202/13* (2013.01); *B22F 2202/15* (2013.01); *B22F 2301/205* (2013.01); *B22F 2302/35* (2013.01); *B22F 2999/00* (2013.01)

(56) References Cited

U.S. PATENT DOCUMENTS

| 2003/0145685 | A1* | 8/2003 | Owers | C22C 1/053 |
| | | | | 75/765 |
| 2005/0279187 | A1 | 12/2005 | Shekhter et al. | |

FOREIGN PATENT DOCUMENTS

| CN | 102206081 B | 9/2013 |
| KR | 10-0257479 B1 | 3/2000 |
| KR | 10-2011-0007717 A | 1/2011 |
| KR | 10-2013-0110571 A | 10/2013 |
| WO | WO 2015/023438 A1 | 2/2015 |
| WO | WO 2015/053239 A1 | 4/2015 |

OTHER PUBLICATIONS

C. L. Yeh, Combustion Synthesis: Principles and Applications, Encyclopedia of Materials: Science and Technology (Year: 2010).*
Ray Cucco Particulate Solid research Institute, Introduction to fluidization, American Institute of Chemical Engineers, (Year: 2014).*
Hunt, Emily M., and Michelle L. Pantoya. "Ignition dynamics and activation energies of metallic thermites: From nano-to micron-scale particulate composites." Journal of applied physics 98.3 (2005): 034909. (Year: 2005).*
Supplementary European Search Report issued by the European Patent Office for corresponding European application 16789362.7 dated Oct. 30, 2018.
Search Report issued by Finnish Patent and Registration Office for priority application 20155332 dated Nov. 13, 2015.
International Search Report and Written Opinion issued by Finnish Patent and Registration Office, acting as the ISA, for international application PCT/FI2016/050272 dated Aug. 10, 2016.

* cited by examiner

METHOD FOR FORMING POWDER PARTICLES AND A PRODUCT

CROSS-REFERENCE TO RELATED APPLICATIONS

This application is the National Stage entry under 35 § 371 of International Application Number PCT/FI2016/050272 filed on Apr. 27, 2016, published on Nov. 10, 2016 under publication number WO 2016/177935 A1, which claims the benefit of priority under 35 U.S.C. § 119 of Finnish patent application number 20155332 filed May 7, 2015.

FIELD OF THE INVENTION

The invention relates to a method defined in the preamble of claim 1 for forming powder particles. Further, the invention relates to a product defined in the preamble of claim 14.

BACKGROUND OF THE INVENTION

Known from prior art is different methods for forming metal based composite powder, e.g. WC composite material. Typically the fused and crushed processing route of composite powder consists of next steps: mixing of precursors, thermal synthesis, crushing, sieving, spheroidization, if spherical powder with good flowability is needed, and classification.

Some metals, such as tungsten W and cobalt Co have been listed as critical metals. Therefore it is important to find substituting materials which have similar properties than the critical metals.

OBJECTIVE OF THE INVENTION

The objective of the invention is to disclose a new method for forming powder particles. Another objective of the invention is to produce a new type powder particles product. Another objective of the invention is to find substituting materials for critical material, e.g. W or Co based materials, and new processing routes for these. Another objective of the invention is to produce composite powders suitable for new manufacturing technologies, e.g. for additive manufacturing.

SUMMARY OF THE INVENTION

The method and the product according to the invention are characterized by what has been presented in the claims.

DETAILED DESCRIPTION OF THE INVENTION

The invention relates to a method for forming powder particles. The method comprises: feeding a start material mixture including more than one constituents in the form of granules into a reactor comprising a reaction zone, e.g. a reactor chamber, and a heat source, preferably at least one heat source; performing reactive thermal synthesis, preferably exothermic reactive synthesis, in the reaction zone in which the start material mixture is moved, preferably fluidized, and the constituents of the start material mixture react in the presence of heat so that the reaction is started by means of heat of the reactor and energy of the start material mixture is released in the form of heat in order to achieve the reaction; and producing powder particles during the reaction.

Further, the invention relates to a powder particles product obtainable by the method according to the present invention.

The invention is based on a rapid synthesis. Further, the invention is based on an in-situ synthesis. Further, the invention is based on an exothermic reaction. During the synthesis one constituent of the start material mixture reacts with another constituent of the start material mixture. Further, the invention is based on a combination of the start material that is moved, preferably fluidized, in the reaction zone and heat during the reaction. Then loose powder particles can be formed in the reactor. Preferably, the invention is based on a formation of powder particles, e.g. in one embodiment a formation of carbide based powder particles.

In this context, the start material mixture means any start material mixture comprising suitable constituents, e.g. at least metal, carbon, nitrogen, oxygen and/or inorganic constituent. Preferably, the start material mixture contains more than one constituent. The start material mixture may comprise any suitable constituents. In one embodiment, the start material mixture includes carbon, titanium, silicon, vanadium, hafnium, zirconium, tantalum, boron, nitrogen, iron nickel, molybdenium, cobalt, aluminum or their combinations, i.e. their mixtures. The start material mixture is in the form of granules when it is fed into a reactor. Each granule may contain one or more constituents. In one embodiment, the granule comprises at least two different elements, such as constituents. In one embodiment, the start material mixture is reactive material so that it is suitable to react in the presence of heat in the reactor. In one embodiment, the start material mixture comprises reactive precursor material. In one embodiment, the start material mixture is a homogeneous mixture.

In one embodiment, the start material mixture is formed from at least two raw material components by means of mixing and granulation so that the particles of the raw material components are mixed and granulated in order to form granules. In one embodiment, the particles of the raw material components are modified, mixed and granulated in order to form granules. In this context, the raw material component should be understood as referring to any suitable raw material. In one embodiment, the raw material is a recycled material, e.g. from used products or from an overflow of powder particles. In one embodiment, the raw material component is modified before the forming of the granules and/or during the forming of the granules. In one embodiment, the particles of the raw material component have been modified, e.g. by means of a mechanical milling of particles. Particle modification and granulation of the raw material ensure good contact with reacting components and controlled packing. Good contact between the constituents of the starting material mixture is essential for the homogenous structure of the powder particle product.

In one embodiment, the start material mixture includes an agent that facilitates the formation of the granule. In one embodiment, the granule of the start material mixture contains a binder. In one embodiment, the granule of the start material mixture includes carbon, titanium oxide and/or aluminum oxide, preferably as a binder. Preferably, the granule of the start material mixture contains a fine-grained binder for facilitating the formation of the granule.

In one embodiment, size of the granule of the start material mixture is below 0.5 mm. In one embodiment, the different granules have different particle sizes. When the granules have small size, the rapid synthesis is possible.

In one embodiment, the reactor comprises at least one heat source, such as a high temperature source. In one embodiment, the reactor comprises a flame based heating unit. In one embodiment, the reactor comprises an oxygen-acetylene flame unit. In one embodiment, the reactor comprises a plasma initialization unit. In one embodiment, the reactor comprises a resistance furnace. In one embodiment, the reactor comprises an induction based heat source. In one embodiment, the reactor comprises a laser based heat source. Preferably, the heat works as an initiator of the reaction. In one embodiment, a resistance furnace, an induction based heat source or a laser based heat source is used as the heat source in the reactor. In one embodiment, a flame synthesis, a flame pyrolysis, a laser initialization or a plasma initialization or their combination is performed in the reaction zone, e.g. in the reactor chamber. In one embodiment, a flame synthesis is performed in the reaction zone. In one embodiment, a flame pyrolysis is performed in the reaction zone. In one embodiment, a laser initialization is performed in the reaction zone. In one embodiment, a plasma initialization is performed in the reaction zone. Preferably, the start material mixture is fed to the high temperature source in the reaction zone where the constituents of the start material mixture react in order to form desired composite powder particles. Preferably, the heat source triggers the carbide, boride, nitride and/or oxide formation reaction and the granules are heated through the whole granule. Preferably, heat of the heat source is used as an initiator of the reaction and heat energy is generated by means of the reaction in the reaction zone.

In one embodiment, high processing temperature is used in the reaction zone. In one embodiment, the temperature is over 1100° C., or over 1300° C., or over 1500° C. In one embodiment, short processing time is used. In one embodiment, short retention time is used in the reaction zone. In one embodiment, the short retention time is adjusted depending on the start material mixture, the reactor and other processing conditions. In one embodiment, the retention time is about below 5 seconds. In one embodiment, the high processing temperature and short retention time are used in the reaction zone, i.e. the start material mixture is processed under conditions comprising high processing temperature and short retention time in the reaction zone.

In one embodiment, the start material mixture is fluidized in the reaction zone. Then the granules don't adhere together. Further, the powder particles are loose.

Preferably, the reaction of the start material mixture is an exothermic reaction. In one embodiment, total energy of formation of the powder particles is determined as following: $E_{total} = E_{reaction\ of\ constituents} + E_{heat\ source}$. $E_{heat\ source}$ can be used only as an initiator of the reaction, and then it can be minimized.

In one embodiment, protective gas is used for avoiding oxidation in the reactor. In one embodiment, the protective gas is introduced into the reaction zone. In one embodiment, the protective gas is argon, nitrogen, hydrogen based gas or other suitable gas. In one embodiment, the protective gas is inert gas. In one embodiment, the protective gas is reactive gas, such as nitrogen or hydrogen based gas.

In one embodiment, an additive is introduced into the start material mixture. The additive may be an organic binder, an initiator agent or another suitable additive. In one embodiment, the additive is introduced into the start material mixture before the reactor, or during the reaction in the reactor. However, in a preferred embodiment, an additive is not necessary in the reaction of the invention.

In one embodiment, the start material mixture feed, heat of the reactor and processing time are controllable and adjustable in the reactor. In one embodiment, the start material mixture feed, heat of the reactor and processing time are controlled and adjusted to improve the reaction in the reaction zone.

In one embodiment, the synthesis is TiC-metal synthesis. In one embodiment, the synthesis is TiB-metal synthesis. In one embodiment, the synthesis is ZrB-metal synthesis. In one embodiment, the synthesis is $B_4C$-metal synthesis.

In one embodiment, powder particles which have good flowability are produced. In one embodiment, spheroidized particles are produced. In one embodiment, smooth and round particles are produced. In one embodiment, particle size of the powder particles is below 500 μm, preferably below 250 μm and more preferably below 125 μm.

In one embodiment, composite particles are produced. In one embodiment, carbide based composite particles are produced. In one embodiment, metal based composite particles are produced. In one embodiment, a fine structured alloy is produced. In one embodiment, the powder particles are metal-metal particles, or oxide-metal particles, or oxide-carbide particles, or oxide-oxide particles or their combinations or their mixtures. In one embodiment, the powder particles which belong to the group consisting of particles of TiC, $TiB_2$, TiC—Fe, Ti(N,C), TiC—$Al_2O_3$, $ZrB_2$, $B_4C$ or $B_4CAl_2O_3$ or their combinations are formed during the reaction.

In one embodiment, the powder particles are cooled.

In one embodiment, the classification is made by means of any suitable classification device after the reactor.

In the present invention, a powder particle product can be formed by means of the method described hereinbefore. The product may be an intermediate product or a final product. In one embodiment, the product is supplied to an additional processing step.

The method of the present invention is suitable for new manufacturing technologies, such as additive manufacturing. In one embodiment, the method is used in a manufacture of composite powders, in a manufacture of composite materials, in a bulk component manufacture, in an additive manufacture, in a laser sintering, in a laser melting, in a laser cladding, in a thermal spraying, in a coating manufacture, e.g. in thermal spray coatings, in applications where high mechanical properties, high temperature resistance and/or wear resistance are needed, or in their combinations.

In the present invention alloyed, e.g. micro-alloyed, and rapid manufactured composites, such as carbide based composites, can be formed. The invention provides the advantage that shortened process route is provided when comparing it with conventional composite powder processes. The invention decreases processing steps, and the invention comprises steps: mixing and granulation of start material, reactive synthesis and classification. The method of the invention comprising short processing time and high processing temperature are enabling to use lower grade raw materials and to make nano modification of powders effectively. Thanks to the invention the product can be formed directly as powder particles. Fine structured spheroidized powder with smooth and round particles can be produced. Further, powder particles have improved properties, such as good flowability, increased hardness and increased toughness. Preferably, the chemical composition together with the processing route determines the microstructure and subsequently the properties of the product.

Thanks to the invention the reaction can be adjusted. Further, the energy of the heat source can be decreased. Further, reactivity can be increased.

The method of the invention offers a possibility to form powder particles cost-effectively and energy-effectively. The present invention provides an industrially applicable, economic and affordable way of producing powder particles. The method of the present invention is easy and simple to realize as a production process.

BRIEF DESCRIPTION OF THE FIGURES

The accompanying drawings, which are included to provide a further understanding of the invention and constitutes a part of this specification, illustrate some embodiments of the invention and together with the description help to explain the principles of the invention. In the drawings.

EXAMPLES

The invention is described in more detail by the following examples with reference to accompanying drawings.

The description below discloses some embodiments of the invention in such a detail that a person skilled in the art is able to utilize the invention based on the disclosure. Not all steps of the embodiments are discussed in detail, as many of the steps will be obvious for the person skilled in the art based on this specification.

Figure 1:
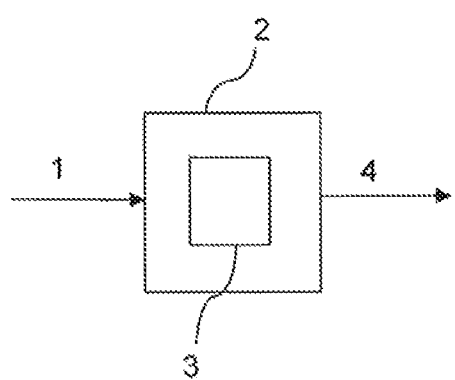
FIG. 1 is a flow chart illustration of a method according to one embodiment of the present invention.

FIG. 1 illustrates a process that may be used to implement a method according to one embodiment of the present invention for forming powder particles product.

Example 1

In this example, powder particles are formed according to a process of FIG. 1.

A start material mixture (1), such as reactive precursor material, comprises at least two different constituents which contain metal, carbon and inorganic constituent. The start material mixture has been granulated. The start material granules are fed into a reactor (2), into the reaction zone, and introduced to a high temperature source (3), such as flame heating unit, where the start material granules (1) are fluidized and where they react and form powder particle product (4) comprising spherical powder particles.

The devices used in this invention are known per se, and therefore they are not described in any more detail in this context.

Example 2

In these tests, powder particles were formed according to a process of the present invention.

TiC-metal particles were formed in-situ TiC-metal synthesis using oxygen-acetylene flame, which was a rapid synthesis for forming carbide based product. Granules of the start material mixture were introduced into the reaction zone, which was flame heating unit, where the flame pyrolysis was performed. The reaction was started with the flame, and the reaction between constituents of the start material mixture was based on an exothermic reaction. Using flame heating unit start material feed and combustion heat and start material retention time in the flame can be adjusted and controlled effectively. Spheroidized, TiC-metal matrix composite powders were able to be done with flame heating setup. Oxidation was avoided by using protective gas like argon.

Figure 2:
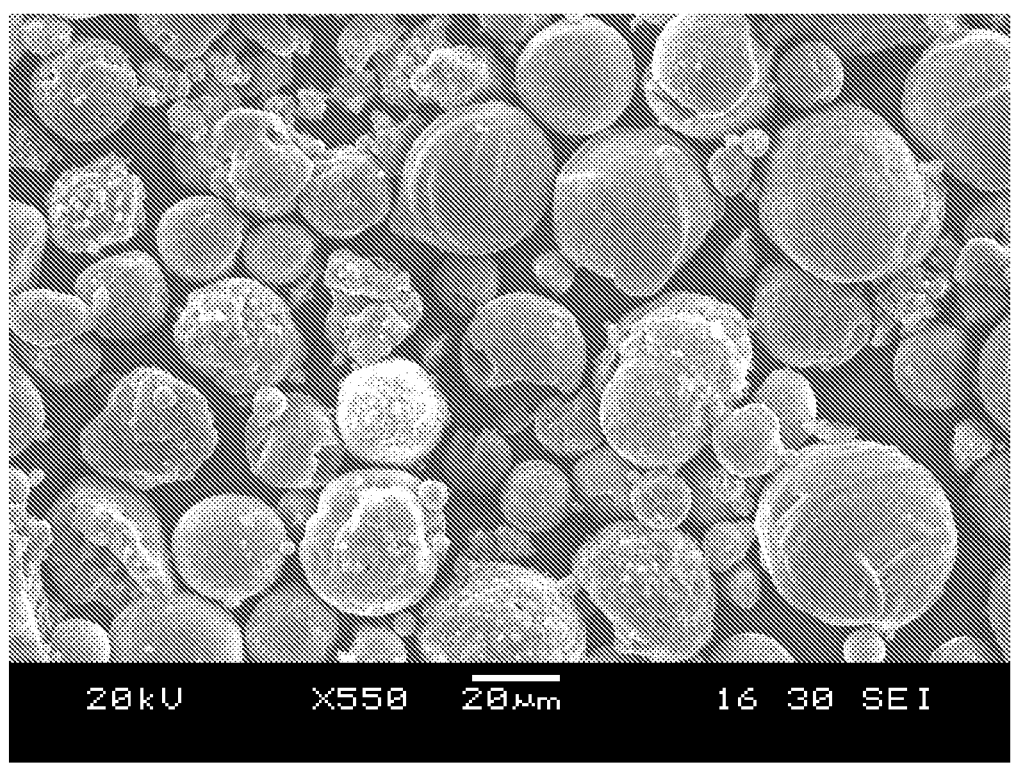
FIG. 2 shows one embodiment of synthesized particles.

It was observed that the in-situ exothermic reaction synthesis ensures the strong bond between hard carbide particles and ductile continuous matrix. It was observed that smooth and round TiC-metal particles can be produced in the tests. The synthesized powder morphology is shown in FIG. 2.

The method according to the invention is suitable in different embodiments to be used for forming the most different kinds of powder particles.

The invention and its embodiments are not limited to the examples described above; instead many variations are possible within the scope of the inventive idea defined by the claims.

The invention claimed is:

1. A method for forming powder particles, the method comprising:
    forming granules from a start material mixture including more than one constituent by granulating the start material mixture to the granules which comprise at least two constituents, the size of which is below 0.5 mm,
    feeding the granules into a reaction zone of the reactor in which a thermal process is performed and the reactor comprises a flame-based heating unit,
    performing the thermal process, as an in-situ synthesis in the reaction zone in which the granules are moved and the constituents of the granules react in the presence of heat to form composite powder particles, and the reaction is started by means of heat of the flame-based heating unit and heat energy is generated by means of the reaction in the reaction zone and is released in order to sustain the reaction between the constituents, and
    producing directly the composite powder particles, wherein the particle size is below 500 µm and wherein the powder particles are carbide-based composite powder particles, during the reaction in the reaction zone.

2. The method according to claim 1, wherein the start material mixture includes a binder that facilitates the formation of granules during the method, the binder being chosen from the group consisting of carbon, titanium oxide, aluminum oxide, and combinations thereof.

3. The method according to claim 1, wherein the start material mixture is selected from the group consisting of: carbon, titanium, silicon, hafnium, zirconium, tantalum, boron, nitrogen, iron, nickel, cobalt, aluminum, and combinations thereof.

4. The method according to claim 1, wherein the flame-based heating unit is sufficient to produce a processing temperature of at least 1100° C.

5. The method according to claim 1, wherein a high processing temperature of at least 1100° C. and short retention time of less than 5 seconds are used in the reaction zone.

6. The method according to claim 1, wherein the start material mixture is fluidized in the reaction zone.

7. The method according to claim 1, wherein protective gas is used for avoiding oxidation in the reactor.

8. The method according to claim 1, wherein the start material mixture feed, heat of the reactor and processing time are controllable and adjustable in the reactor.

9. The method according to claim 1, wherein the powder particles are oxide metal particles, oxide-carbide particles.

* * * * *